(Model.)
G. D. HAWORTH.
CORN PLANTER.
No. 263,403.
2 Sheets—Sheet 2.
Patented Aug. 29, 1882.
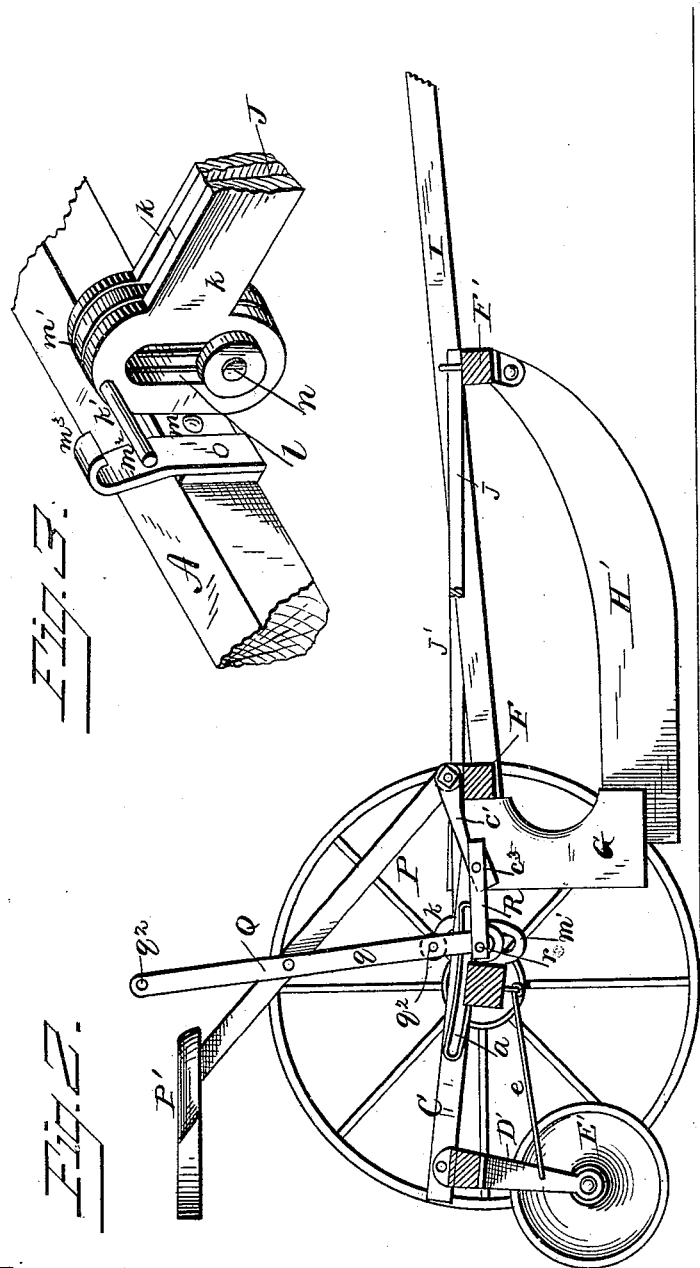
Witnesses:
Franck L. Ourand
R. M. Smith
Inventor:
George D. Haworth
by A. M. Smith
atty.

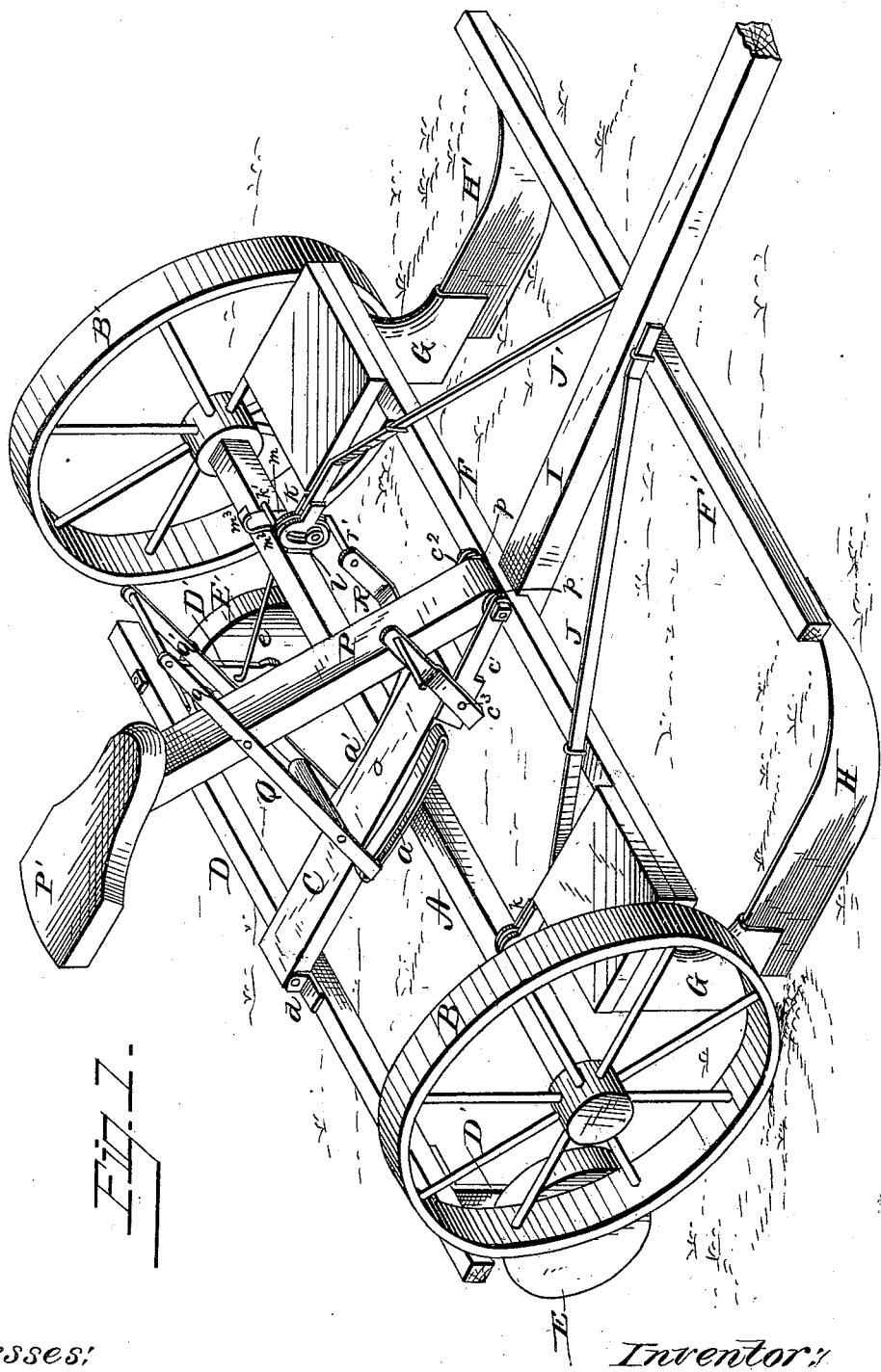

UNITED STATES PATENT OFFICE.

GEORGE D. HAWORTH, OF DECATUR, ILLINOIS.

CORN-PLANTER.

SPECIFICATION forming part of Letters Patent No. 263,403, dated August 29, 1882.

Application filed May 25, 1882. (Model.)

*To all whom it may concern:*

Be it known that I, GEORGE D. HAWORTH, of Decatur, county of Macon, and State of Illinois, have invented new and useful Improvements in Corn-Planters, of which the following is a full, clear, and exact description, reference being had to the accompanying drawings, making part of this specification, in which—

Figure 1 represents a perspective view of so much of a corn-planter as is necessary to show my improvements, with the parts in working position. Fig. 2 is a side elevation of the same, with the seeding parts of the machine and the coverers raised for turning at the ends of the rows or for transportation; and Fig. 3 is a perspective view of the connection between the seeding parts and the main axle-bar of the machine.

My invention relates to a novel means for effecting the adjustment of the seeding part of the machine and of the coverers, for turning the machine at the ends of the rows or for transportation, for holding the furrowing shoes or runners down in the ground at any required depth, and for coupling the seeding part of the machine to the main axle or center bar of the machine, as hereinafter explained.

In the accompanying drawings, A represents the main center or axle bar of the machine, provided at its ends with journals, upon which the carrying-wheels B and B' are mounted, and to which, at or near the center of its length, is rigidly secured a longitudinal bar, C. The bar C has a transverse bar, D, secured to its rear end through slotted brackets d, which permit a slight rocking movement or vertical vibration of said bar D, which, at or near its ends, is provided with pendent brackets D', having stud-axles at their lower ends, upon which the covering wheels or rollers E E' are mounted. Pivoted braces e extend from the pendent brackets D' D' to the axle or main center bar, A, relieving the joint between said brackets and the bar D of the backward thrust or strain on the covering-wheels. The slotted connection between the bars C and D allows the latter to vibrate to accommodate the wheels to slight inequalities in the surface of the ground over which they are drawn. The bar C crosses the main center bar, A, extending in front thereof, and is provided on its vertical sides with grooved segments $a$ $a'$, also crossing the plane of said bar A, as shown, and for a purpose which will be explained.

The seeding part of the machine may be similar to such as are now in common use, and need not therefore be described further than is necessary to show the connection of my improvements therewith.

F and F' represent the transverse bars, with which the shoes G G', runners H H', and seeding devices of any usual or preferred construction and arrangement are connected in any suitable manner.

I is the pole or tongue connecting the bars F and F', and provided with diverging braces or "hounds" J and J', forked and expanded in width vertically at their rear ends, where they connect with the axle-bar A; or, if preferred, said expanded bifurcated portion (indicated at $k$) is made double, or rather in form of two parallel ears having vertical slots $l$ formed in them, with sufficient space between to admit a similar ear, $m'$, formed on a bracket, $m$, secured to the axle-bar A, one for each brace J and J'. A headed bolt or pin, $n$, passing through the slots in the ears $k$ and $m'$, serve to unite the seeding part of the machine to the main axle-bar and acts as a friction-roller in said slots, permitting an easy relative movement between the two parts of the machine. The brackets $m$ are provided with short standards $m^2$, having forwardly-projecting hooks or spurs $m^3$ on their upper ends, which engage with laterally-projecting pins $k'$ on the bifurcated coupling $k$, and serve, in connection with other devices hereinafter described, to lock the seeding part of the machine and the covering-rollers in the elevated position to which they are adjusted for turning or transportation.

To the bar F, at or near the center of its length, a seat or standard, P, is pivoted in a suitable bracket, $p$, and slotted links $c'$ $c^2$, connected at their forward ends with the pivot which unites the seat-standard P with the bracket $p$, one on each side thereof, are pivoted at their rear ends to the forward end of the bar C, forming in connection therewith a toggle-link. The standard P, at or near its upper ends, has a second fulcrum-standard, Q, pivoted to it, made in double or loop form, striding the standard P, and extending above and below it at the point of intersection, as shown. The two side bars, $q\ q$, thereof are united above and below the standard P by transverse bars $q^2$, and are provided at their lower ends with inwardly-projecting spurs or feet, which enter the grooves in the segments $a$ and $a'$ on the opposite sides of the longitudinal bar C. The fulcrum-standard Q serves to uphold the pivoted seat-standard P in the desired position, and the portion extending above said seat-standard serves as a lever-arm for adjusting the feet on the lower end of the standard Q back and forth in the slots in the segments $a$ and $a'$. The links $c'\ c^2$ are shouldered or expanded in width at their rear ends, projecting on their lower edges slightly below the lower face of bar C, and pivot $c^3$, which unites them to said bar, serves also to pivot a reversible foot-stirrup, R, to said bar. This stirrup is made in loop or U shape, open on its upper end, and provided on its arms at said end with laterally-projecting foot rests or bars $r\ r'$. The closed or loop end of the stirrup R crosses the forward end of bar C underneath, and rests against the lower edges of the links $c'\ c^2$.

With the parts in the position shown in Fig. 1 the weight of the driver in the seat P is thrown, through the fulcrum-standard Q, upon the grooved segments $a\ a'$ and bar C in rear of the main center or axle bar, A, and serves to hold the covering-wheels down to their work, while the pressure of his feet forward and downward on the stirrup causes the latter to act upon the projecting ends of the links $c'$ and $c^2$ in rear of the pivot $c^3$, lifting the joint between said links and the bar C and assisting to depress the covering-rollers. This same pressure on the foot-stirrup R serves to depress the forward ends of the links $c'\ c^2$, connected with bar F, and to force the shoes or runners connected with the latter into the ground to a depth varying with the amount of pressure applied.

For raising the seeding part of the machine and covering-rollers from the ground, the attendant draws the lever-arm of the fulcrum-standard Q back until the feet on the lower end of the latter rest in the grooves in segments $a$ and $a'$, slightly in advance of the axle-bar A, when his weight upon the seat-bar P lifts the seeding part of the machine. In this operation the stirrup R is swung back on its pivot until the transverse bar thereof rests underneath the links $c'$ and $c^2$ in front of its pivot and of the forward end of the bar C, and the attendant, by pressing downward on the foot-rests $r$ and $r'$ with his feet, forces down the forward end of the bar C, thereby raising the rear end of said bar, and with it the auxiliary covering-rollers, lifting the latter clear of the ground and depressing the ends of the stirrup until they are carried below and are caught and held by the ends of the fulcrum-standard $q$, the stirrup-arms being made of elastic or spring material, so as to allow them to yield laterally, to pass the ends of the standard, and to spring under them, thereby locking the seeding part of the machine and the coverers in an elevated position, clear of the ground, (shown in Fig. 2,) for turning at the ends of the rows or for transportation. In this position the pins $k'$ on the ears $k$ will be caught and held by the hooks on the brackets $m$, which serve to steady and hold the parts in the relation described, preventing accidental displacement from the jolting of the machine or other cause.

For releasing and depressing the seeding part of the machine and the coverers, the driver simply thrusts the upper lever end of the fulcrum-standard forward, forcing the feet at its lower end backward until they are in rear of the axle-bar, the same movement releasing the stirrup R, when the parts are made to resume the working position shown in Fig. 1.

Modifications may be made in the construction of some of the parts—as, for example, the segments $a$ and $a'$ may be tongued instead of grooved, in which case the feet of the fulcrum-standard would necessarily be forked to clasp the tongues, and other similar modifications may be made, if desired, without departing from my invention.

Having now described my improvements, what I claim as new is—

1. The pivoted seat-standard, in combination with the fulcrum-standard pivoted thereto, and the segments on the rocking frame or frame-bar with which the coverers are connected, arranged and operating substantially as described.

2. The coverer-frame or frame-bar extended in front of the axle-bar, in combination with the pivoted links connecting said bar with the seeder-frame and the reversible foot-stirrup, arranged and operating substantially as described.

3. The combination of the pivoted seat-standard, the fulcrum-standard pivoted thereto, the grooved segments on the coverer-frame or frame-bar, and the pivoted link connecting said bar with the seeder-frame, substantially as described.

4. The combination of the pivoted seat and fulcrum standards with the main or coverer frame and the seeder-frame jointed to said main frame, the grooved segments on the latter, the pivoted link connecting the latter and the seeder-frame, and the reversible stirrup, arranged and operating substantially as described.

5. In a seed-planting machine having rear auxiliary covering-rollers, the combination, with said rollers, of the movable fulcrum-standard, whereby said covering-rollers with the fulcrum in one position are forced down firmly to the ground, and in another position are entirely relieved of pressure, substantially as described.

6. The combination, in a seed-planting machine, of the front and rear covering-rollers, as shown, and the double-slotted hinge-connection between the covering-roller frame and the seeding part of the machine, whereby the seeding part and covering-rollers are permitted to move independently of each other, substantially as set forth.

7. The slotted double ears $k$, in combination with the slotted ears $m'$ and rollers working in the slots in said ears, for coupling the main axle bar or frame to the seeder-frame, substantially as described.

8. The combination, with the pivoted seat and fulcrum standards and the grooved segments, pivoted links, and reversible foot-stirrup connected therewith, of the hooked standards on the main frame and the pins or stops on the seeder-frame, arranged and operating substantially as described.

In testimony whereof I have hereunto set my hand this 22d day of May, A. D. 1882.

GEORGE D. HAWORTH.

Witnesses:
 W. E. HAWORTH,
 C. O. JUDSON.